United States Patent [19]
Herriot

[11] Patent Number: 6,134,583
[45] Date of Patent: *Oct. 17, 2000

[54] METHOD, SYSTEM, APPARATUS AND ARTICLE OF MANUFACTURE FOR PROVIDING IDENTITY-BASED CACHING SERVICES TO A PLURALITY OF COMPUTER SYSTEMS (#16)

[75] Inventor: Robert G. Herriot, Palo Alto, Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/675,238

[22] Filed: Jul. 1, 1996

[51] Int. Cl.$^7$ .................................................. G06F 17/30

[52] U.S. Cl. ........................................ 709/217; 707/501

[58] Field of Search ....................... 395/200.47, 200.48, 395/200.49; 709/217, 218, 219; 707/10, 104, 501, 200

[56] References Cited

U.S. PATENT DOCUMENTS

| | | | |
|---|---|---|---|
| 5,341,478 | 8/1994 | Travis, Jr. et al. ................. | 395/200.33 |
| 5,347,632 | 9/1994 | Filepp et al. ........................ | 395/200.32 |
| 5,426,747 | 6/1995 | Weinreb et al. ..................... | 711/203 |
| 5,430,872 | 7/1995 | Dahod et al. ........................ | 707/104 |
| 5,440,744 | 8/1995 | Jacobson et al. .................... | 395/200.33 |
| 5,465,365 | 11/1995 | Winterbottom ..................... | 707/101 |
| 5,557,785 | 9/1996 | Lacquit et al. ....................... | 707/104 |
| 5,561,793 | 10/1996 | Bennett et al. ...................... | 707/201 |
| 5,649,200 | 7/1997 | Leblang et al. ..................... | 395/703 |
| 5,664,185 | 9/1997 | Landfield et al. ................... | 707/104 |
| 5,761,655 | 6/1998 | Hoffman ............................... | 707/4 |

FOREIGN PATENT DOCUMENTS

0834818 A2  4/1998  European Pat. Off. .

OTHER PUBLICATIONS

"The Handle System", Corporate for National Research Initiatives, http://www.handle.net/overview.html, last modified Jun. 20, 1996.

Chankunthod et al. "A Hierachical Internet Object Cache", Proceedings USENIX '96, 1996.

Jeffery et al. "Proxy–Sharing Servers" Emerging Technologies and Applications in Communication, 1996 Conf. :pp. 116–119. CD. IEEE/IEE Publication Ondisc, 1996.

Liu et al. "Distributed Wed Server and Its Performance Analysis on Multiple Platforms", Distributed computing System, 1996 International Conf.: pp. 665–672. CD. IEEE/IEE Publishcation Ondic, 1996.

Anderson, Thomas E., et al., "Serverless Network File Systems," *Operating Systems Review (SIGOPS)*, 29:5, Dec. 1, 1995, pp. 109–126, XP 000584821.

Anonymous, "Extensible Language Independent Method of Specification for Arbitrary ASN.1 Values," *IBM Disclosure Bulletin*, 37:48, Apr. 1994, pp. 353–356, XP002091096.

Anonymous, "Multisystem Interconnect Facility," *IBM Technical Disclosure*, Dec. 1979, pp. 2831–2835, XP002090134.

Anonymous, "Name Server Based Naming Algorithms with the Concept of Assigned Pre–Fixes in Distributed Directory Environment," *IBM Technical Disclosure Bulletin*, 28:8, Jan. 1986, pp. 3583–3588, XP002091097.

*Primary Examiner*—Dung C. Dinh
*Attorney, Agent, or Firm*—Beyer Weaver & Thomas, LLP

[57] ABSTRACT

A procedure for obtaining a copy of a data object is disclosed. A client computer provides a server computer, such as a proxy server, a firewall or a gateway, with a request for a data object. The request includes a location-independent identifier associated with the desired data object is obtained. The server computer interrogates a cache to determine whether a copy of the data object is cached. If the data object is cached, the server computer obtains a copy of the cached data object from the cache. If the data object is not cached, the server computer performs a network call to obtain a new copy of the data object.

46 Claims, 11 Drawing Sheets

Fig. 3

310 — `<HTML>`
`<HEAD>`
`<TITLE>` Welcome to System A `</TITLE>` — 320
`</HEAD>`

`<BODY>`

330 {
`<APPLET>` CODE=FOO.CLASS
WIDTH=300 HEIGHT=100
OID=1.1.999999.72.6.3>
`</APPLET>` 350
}

340 / 342 / 344

`</BODY>`

`</HTML>`

SYSA/PAGE1.HTML

Fig. 7

```
<HTML>
<HEAD>
<TITLE>   System B Introduction Page   </TITLE>
</HEAD>

<BODY>
  Welcome to SYSTEM B.
    <P>
  <APPLET>   CODE=BAR./CLASS
         WIDTH=320 HEIGHT=120
         OID=1.1.999999.72.6.3>
  </APPLET>

</BODY>
</HTML>
```

SYSB/INTRO.HTM

METHOD, SYSTEM, APPARATUS AND ARTICLE OF MANUFACTURE FOR PROVIDING IDENTITY-BASED CACHING SERVICES TO A PLURALITY OF COMPUTER SYSTEMS (#16)

COPYRIGHT NOTIFICATION

Portions of this patent application contain materials that are subject to copyright protection. The copyright owner has no objection to the facsimile reproduction by anyone of the patent document, or the patent disclosure, as it appears in the Patent and Trademark Office.

FIELD OF THE INVENTION

This invention relates to a system, method and apparatus for improving response time of a network based transaction session. More particularly, the invention relates to a system, method and apparatus to alleviate network load by use of a location-independent-indexedcache to eliminate repetitive and/or redundant transfers of data objects already resident in the cache.

BACKGROUND OF THE INVENTION

In a number of interactive network applications, it is common for a user to request access to data that is housed on a remote site, but which data has previously been transferred to the user during an earlier session, or an earlier point of time in the present session. The process of requesting the transfer of such information over the network consumes significant time and network resources, particularly if the resource requested is of a substantial size. Therefore, it is desirable to provide a means to recognize that a particular resource stored at a remote location is already available on the users local computer system, and to obtain the desired copy from that local version, rather than performing a network call to obtain a new identical copy. In the past, programs such as World Wide Web browsers (such as Sun Microsystems, Inc.'s HotJava, Netscape Communications Corp.'s Netscape Navigator and Microsoft Corp.'s Internet Explorer) frequently have operated using a cache indexed by a Uniform Resource Locator (URL). By means of this cache, the WWW browser can recognize when a particular URL has been previously referenced, and may present data that had been previously obtained in response to the previous request for the same URL.

However, one shortcoming of this approach is that a URL-indexed cache is capable of providing the user with the previously recovered copy of the requested resource only when the second request for the resource is requesting that resource from the exact location as that from which the resource was initially obtained. That is, if the user requests that a resource be obtained from a new location, a WWW browser equipped with a URL-indexed cache will obtain the requested resource from the specified location, even if the same data is already resident on the user's computer system from a previous transfer from a different location. This approach results in an undesirable amount of redundant data transfers.

This problem is particularly aggravated when the resource requested is not requested under the user's direct control. An example of such a case is where a user requests a particular resource, and that resource in turn requires additional resources. The user has no opportunity to indicate to the system that previously obtained resources should be used instead of redundant copies of the secondary resources. For example, a user may request a particular web page to be displayed, and that page may in turn request transmission of a graphic image to be displayed, or a program (often referred to as an "applet") to be executed in conjunction with the displayed page. The user has no opportunity to indicate to the browser that a previously obtained image file or applet file should be used in lieu of the file located at the remote location.

It is desirable, therefore, to support a remotely located resource that resides on a plurality of computer systems that are identified by a location-independent identifier, thereby allowing reuse of a previously obtained copy of that resource, even if the previously obtained copy was obtained from a different location.

SUMMARY OF THE INVENTION

A system, method, and apparatus for obtaining a copy of a data object is disclosed. A client computer provides a server computer, such as a proxy server, a firewall or a gateway, with a request for a data object. The request includes a location-independentidentifier associated with the desired data object is obtained. The server computer interrogates a cache to determine whether a copy of the data object is cached. If the data object is cached, the server computer obtains a copy of the cached data object from the cache. If if the data object is not cached, the server computer performs a network call to obtain a new copy of the data object.

Additional features of the invention will become apparent upon examination of the description that follows, particularly with reference to the accompanying drawings.

DESCRIPTION OF THE DRAWINGS

The foregoing and other objects, aspects and advantages are better understood from the following detailed description of a preferred embodiment of the invention with reference to the drawings, in which:

FIG. 3 depicts an example of a downloaded HTML document;

FIG. 7 depicts an example of a second HTML document specifying retrieval of an applet;

DETAILED DESCRIPTION

Figure 1:
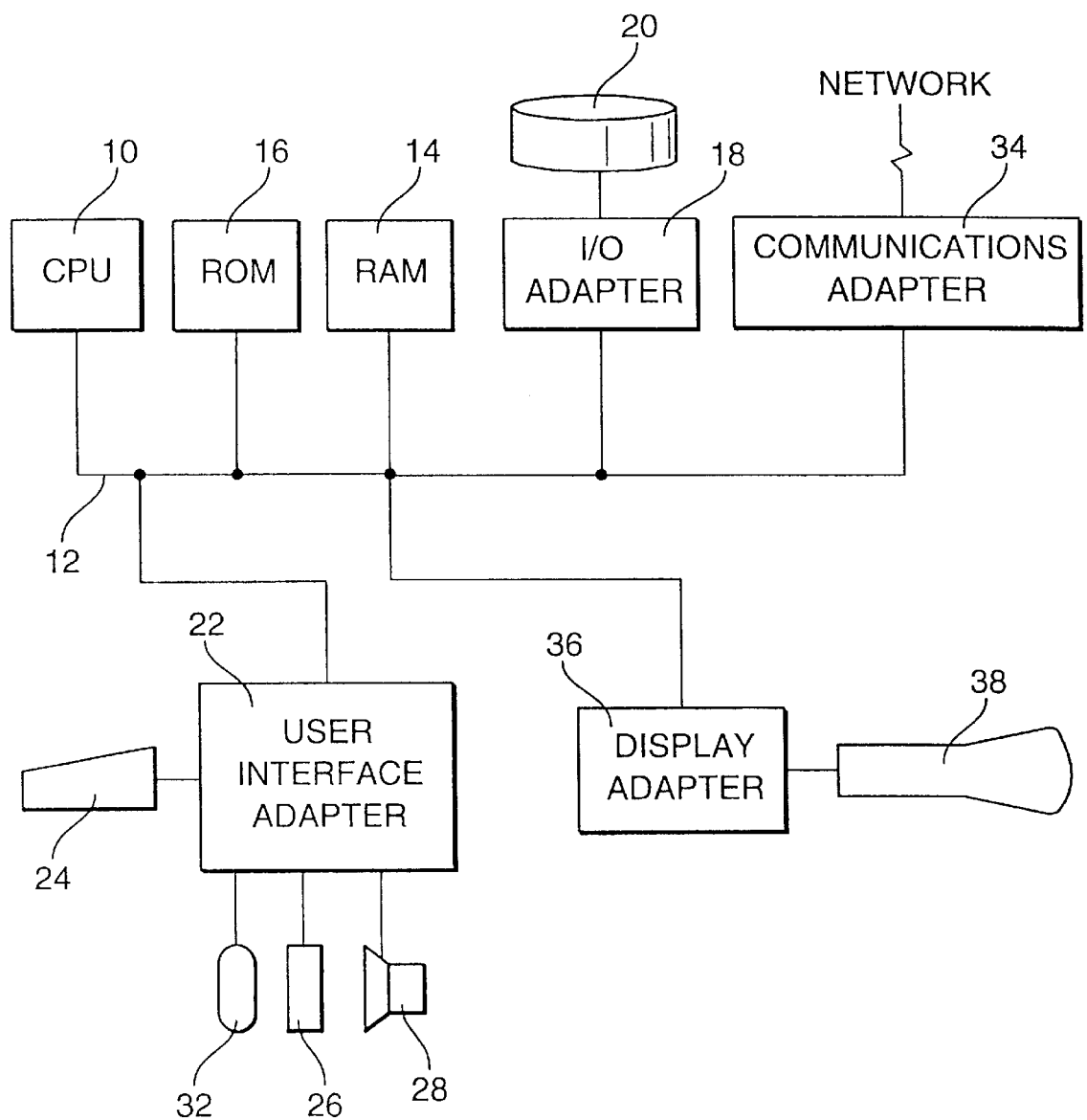
FIG. 1 is a block diagram of a representative hardware environment in accordance with a preferred embodiment.

A preferred embodiment of a system in accordance with the present invention is preferably practiced in the context of a personal computer such as the IBM PS/2, Apple Macintosh computer or UNIX based workstation. A representative hardware environment is depicted in FIG. 1, which illustrates a typical hardware configuration of a workstation in accordance with a preferred embodiment having a central processing unit 10, such as a microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk storage units 20 to the bus 12, a user interface adapter 22 for connecting a keyboard 24, a mouse 26, a speaker 28, a microphone 32, and/or other user interface devices such as a touch screen (not shown) to the bus 12, communication adapter 34 for connecting the workstation to a communication network (e.g., a data processing network) and a display adapter 36 for connecting the bus 12 to a display device 38. The workstation typically has resident thereon an operating system such as the Microsoft Windows Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using Java, C, and the C++ language and utilizes object oriented programming methodology. Object oriented programming (OOP) has become increasingly used to develop complex applications. As OOP moves toward the mainstream of software design and development, various software solutions will need to be adapted to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture.

It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines will have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, our logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built, objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, common lisp object system (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times. There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer writes instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes Hypertext Markup Language (HTML) to implement documents on the Internet together with a general-purpose secure communication protocol for a transport medium between the client and the merchant. HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879:1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g. real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g. simple animations, page adornments, basic games, etc.). Applets execute within a Java-compatible browser (e.g. Netscape Navigator) by copying code from the server to client. From a language standpoint, Java's core feature set is based on C++. Sun's Java literature states that Java is basically "C++, with extensions from Objective C for more dynamic method resolution".

Another technology that provides similar function to Java is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art will readily recognize that ActiveX could be substituted for Java without undue experimentation to practice the invention.

Figure 2:
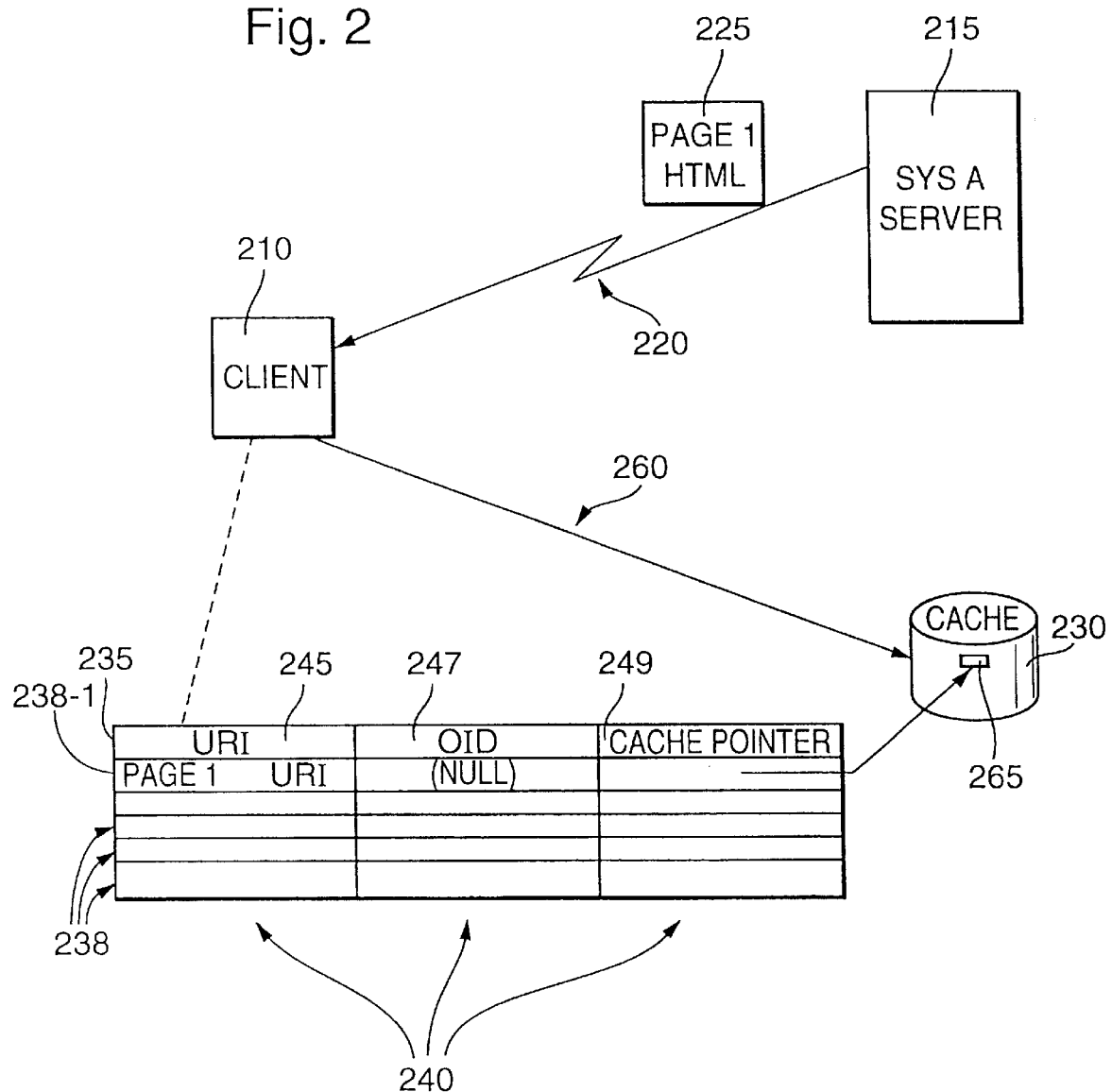
FIG. 2 depicts a client computer operating a network client program in communication with a server computer.

FIG. 2 depicts a client computer 210 operating a network client program, such as a web browser, in communication with server computer 215. Server 215 may be, for example, a hypertext transport protocol ("HTTP") server. Server 215 is named "SYSA". This denotes that the server is addressed with a name such as SYSA, or is located externally to the client's network, for example, in a system with the name SYSA.COM. Server 215 is in communication with client 210 using a communications link 220 operating, for example, using the HTTP protocol and the Transmission Control Protocol and Internet Protocol ("TCP" and "IP," respectively, or collectively "TCP/IP"). HTTP is described in R. Fielding, et al., *Hypertext Transfer Protocol: HTTP*/1.1 (Jun. 3, 1996) (draft), the disclosure of which is hereby incorporated by reference. TCP is described in Information Sciences Institute, *RFC 793: Transmission Control Protocol DARPA Internet Program Protocol Specification* (Sep. 1981), the disclosure of which is hereby incorporated by reference. IP is described in Information Sciences Institute, *RFC 791: Internet Protocol DARPA Internet Program Protocol Specification* (Sep. 1981), the disclosure of which is hereby incorporated by reference.

As depicted in FIG. 2, server 215 is transferring a copy of document 225, named PAGE 1.HTML, to client 210, in response to a previous HTTP GET request (not shown) by client 210. Client 210 is equipped with a cache file 230 indexed by a cache table 235. Cache table 235 is a table used to index cache 230. Cache table 235 comprises a plurality of rows 238 and columns 240. Each row 238 is used to describe a cached element, such as downloaded HTML document 225. Columns 240 include a URI column 245, an OID column 247, and a cache pointer column 249. The use of the cache table will be described in further detail below, however, in summary, URI column 245 contains a representation of a location code of a cached resource. Typically this will be a representation of a Uniform Resource Identifier ("URI"), such as a Uniform Resource Locator ("URL"), or any other indicator of the location of the cached resource. The syntax and semantics of URLs are described in Berners-Lee, et al., *RFC 1738: Uniform Resource Locators (URL)* (December 1994), the disclosure of which is hereby incorporated by reference.

OID column 247 contains an object identifier, if any for the cached resource, or is null if no object identifier is associated with the cached resource. Cache pointer column 249 contains a pointer to the cache element in the cache. This may be, for example, the name of a file located within a specific predetermined cache directory or cache device, or it may be a specification of a location within a larger file of a particular portion of the file corresponding to the cached resource. In addition, the cache table will typically contain additional fields used to manage and optimize a cache table, such as indicators of whether a particular cache row 238 is in use, its frequency of reference, etc. Such fields are not a portion of the present invention and are not herein described.

As depicted in FIG. 2, client 210 transfers a copy of downloaded file 225 to cache 230 as shown by arrow 260. As depicted in FIG. 2, a copy of document 225 is cached at location 265, and cache table row 238-1 is updated to reflect the cache. In particular, for cache table row 238-1, URI column 245 is set to the value of the URI for the retrieved document. Column 247 is set to null because, as will be described in further detail, no OID has been associated with this resource. Column 249 has been set to point to cached element 265.

FIG. 3 depicts an example of downloaded document 225. In the depicted example, the file is in Hypertext Markup Language ("HTML"). The HTML format is described in Berners-Lee, et al., *RFC 1866: Hypertext Markup Language*-2.0 (November 1995), which is hereby incorporated by reference. The HTML document 225 comprises a plurality of HTML tags 310 and text 320 to be rendered and displayed. With the exception of the applet tag 330, all of HTML tags 310 are known and described in Berners-Lee, and are not further described herein. Applet tag 330 is an HTML tag that is used to specify an applet that should be loaded and executed when HTML document 225 is rendered and displayed. Specifically applet tag 330 is an extension to HTML devised by Sun Microsystems, Inc. of Mountain View, Calif. Typically, applets are written in a platform-independent object-oriented language such as Sun Microsystem's Java language. A Java applet is generally transported in the Sun's CLASS-format file. Applet tag 330 contains four parameters: CODE parameter 340, WIDTH parameter 342, HEIGHT parameter 344, and OID parameter 350. The CODE, WIDTH, and HEIGHT parameters are known in the art. The CODE parameter 340 is used to specify the name of a program file to be downloaded from the same server location as HTML document 225. In the example depicted, CODE parameter 340 indicates that the program named FOO.CLASS is to be obtained from the SYSA server 215 because the web page was part of the HTML information. WIDTH parameter 342 and HEIGHT parameter 344 indicate the size of screen area where the output of the applet will be displayed. In the example shown, an area 300 pixels wide and 100 pixels high is specified.

The OID parameter 350 is not previously known. OID parameter 350 is used to specify an object identifier. The object identifier is a unique identifier associated with a particular object. The OID associated with a particular object is guaranteed to be unique. A preferred method of specifying the OID is using Abstract Syntax Notation One ("ASN.1"), as described in ISO 8824, and the ASN.1 Basic Encoding Rules ("BER") as described in ISO 8825. ASN.1 and BER provide for an "object identifier" datatype.

The ASN.1 object identifier is in the form of a series of integers separated by decimal points. Each integer represents a node on an ASN.1 object identifier tree. The ASN.1 object identifier tree is a structure with a root node, arcs beneath that node to other nodes, with arcs beneath them and so on. As specified in the ASN.1 standard, each node is assigned to some responsible body that allocates arcs and nodes beneath it. The body ensures that all the arcs beneath its node are numbered sequentially starting from 0 or 1, and that each node beneath it is either assigned to some responsible body or is assigned to name a particular object. In the example shown, the OID has a value of 1.1.999999.72.6.3. The first integer, 1, has been allocated to the International Standards Organization ("ISO"). The ISO, therefore, has the responsibility for allocating every OID beginning with the integer 1. The second integer 1 indicates that this object is within an ASN.1 hierarchy allocated to a "registration authority" ("RA"). A registration authority is an organization that is responsible for the allocation of any further ASN.1 OIDs within its name space. In the example shown, the fictitious registration authority code 999999 is used to depict that a particular responsibility authority having been assigned a code 999999 is responsible for any object identifiers below this level. The remaining integers (72, 6, and 3) are arbitrary integers organized according to a functional scheme selected by the registration authority corresponding to RA code 999999, and guaranteed by the registration authority to be unique in the world. ASN.1, BER, the ASN.1 object identifier, and the ASN.1 object identifier tree are known constructs and are described in their respective standards and, for example, in Larmouth, *Understanding OSI* (International Thomson Computer Press, 1996), pp. 151–160, hereby incorporated by reference.

It will be seen from FIG. 3, therefore, that the desired applet may be referred to either by a particular known location (file name FOO.CLASS on server SYSA) or by its ASN.1 object identifier (1.1.999999.72.6.3).

Figure 4:
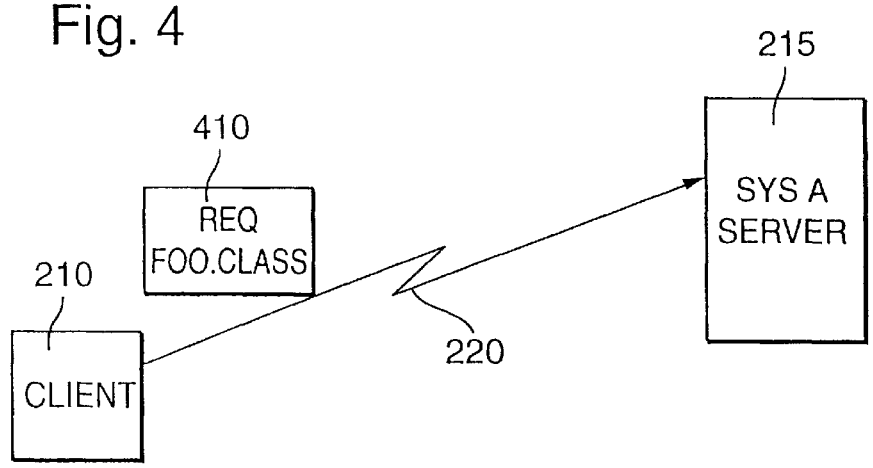
FIG. 4 depicts an operation of obtaining an applet specified by an applet tag.

FIG. 4 depicts an operation of obtaining the applet specified by applet tag 330 of FIG. 3. In the example depicted, the applet specified by applet tag 330 has not been previously obtained, and therefore is unavailable from cache 230 of FIG. 2. Therefore, as depicted in FIG. 4, client 210 issues an HTTP GET request for the resource named FOO.CLASS on connection 220 to server SYSA 215.

Figure 5:
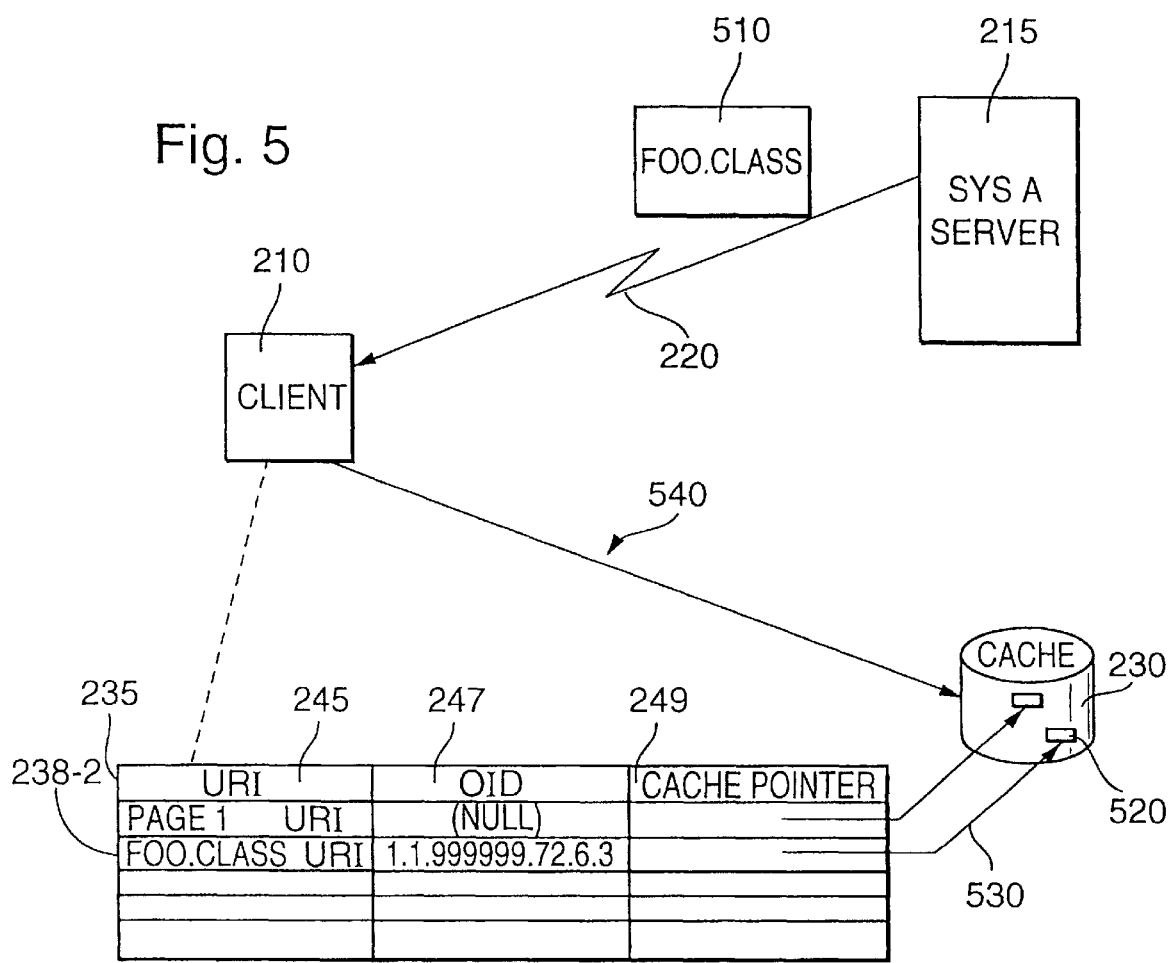
FIG. 5 depicts the server response to an HTTP GET request.

FIG. 5 depicts the server response to the GET request. Server 215 transmits a copy 510 of the FOO.CLASS object on communications line 220 to client computer 210. Client computer 210 places a copy of received file 510 in cache 230 as cache element 520. Client computer 210 then updates cache table 235 to reflect the cache update. Specifically, client computer 210 updates row 238-2 to reflect newly added element 520. Client computer 210 updates cache table row 238-2 as follows. URI column 245 is set to the value of the URI from which the file was retrieved. OID column 247 is updated with the object identifier value for the object received. Finally, column 249 is updated with a pointer to the cache element 520 within cache 230.

Generally, an object that is received from a server may have an OID encoded into it, so that a client computer such as client computer 210 can discover the object's OID even if no OID had been specified prior to the transfer. The OID may be encoded, for example, in a predetermined position or field within the object, or may be stored on the server separately from the object and included by the server by encoding it into the HTTP GET response.

The Java CLASS format is highly structured and is particularly well-suited for the purpose of encoding an OID into an applet file. The Java CLASS format is described in Sun Microsystem's *Java Virtual Machine Specification, Release* 1.0 *Beta DRAFT* (Aug. 21, 1995), the disclosure of which is hereby incorporated by reference.

Each class file contains the compiled version of either a Java class or a Java interface. An interpreter or "virtual machine" designed to execute a Java applet supports all class files that conform to this format.

A Java class file comprises a stream of 8-bit bytes. All 16-bit and 32-bit quantities are constructed by reading in two or four 8-bit bytes, respectively. The bytes are joined together in network (big-endian) order, where the high bytes come first. This format is supported by the Java java.io..DataInput and java.io.DataOutput interfaces, and classes such as java.io.DataInputStream andjava.io.DataOutputStream.

The class file format is described here using a structure notation. Successive fields in the structure appear in the external representation without padding or alignment. Variable size arrays, often of variable sized elements are called tables and are commonplace in these structures. The types u1, u2, and u4 mean an unsigned one-, two-, or four-byte quantity, respectively, which are read by method such as readUnsignedByte, readUnsignedShort and readInt of the java.io.DataInputinterface.

Figure 5A:
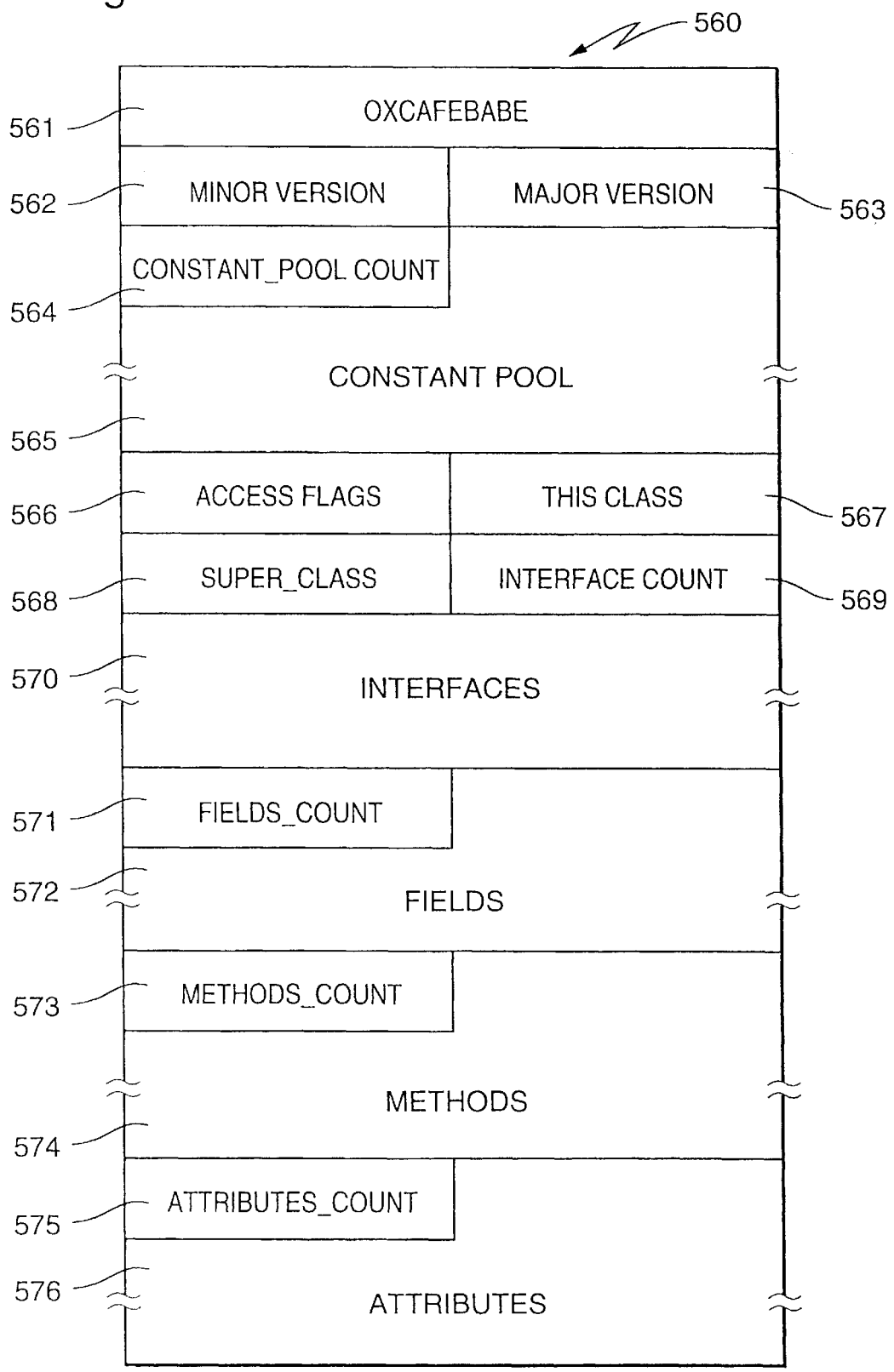
FIG. 5A depicts the format of a Java applet class file.

FIG. 5A depicts the format of a class file 560, which is structured as follows:

```
ClassFile {
    u4 magic;
    u2 minor_version;
    u2 major_version;
    u2 constant_pool_count;
    cp_info constant_pool[constant_pool_count- 1];
    u2 access_flags;
    u2 this_class;
    u2 super_class;
    u2 interfaces_count;
    u2 interfaces[interfaces_count];
    u2 fields_count;
    field_info fields[fields_count];
    u2 methods_count;
    method_info methods[methods_count];
    u2 attributes_count;
    attribute_info attributes[attribute_count];
}
```

Magic

The "magic" field 561 is four bytes in length and is used to identify the file as a Java class-format file. The magic field has the value 0×CAFEBABE.

Minor_Version and Major Version

The minor_version field 562 and major_version field 563 contain the version number of the Java compiler that produced this class file. The combination of the two fields may be interrogated by a virtual machine to determine whether it is capable of executing the applet. An implementation of the virtual machine will normally support some range of minor version numbers 0–n of a particular major version number. If the minor version number is incremented, the new code won't run on the old virtual machines, but it is possible to make a new virtual machine which can run versions up to version number n+1. A change of the major version number indicates a major incompatible change, one that requires a different virtual machine that may not support the old major version in any way.

Constant_Pool_Count

The constant_pool_count field 564 indicates the number of entries in the constant pool 565 in the class file.

Constant_Pool

The constant pool 565 is a table of values. The values in the constant pool 565 comprise various string constants, classnames, field names, and others that are referred to by the class structure or by the executable code in the applet. The first constant pool entry, denoted as constant_pool[0], is always unused by the compiler, and may be used by an implementation for any purpose.

Each of the constant_pool entries 1 through constant_pool_count−1 is a variable-length entry, whose format is indicated by the first "tag" byte, according to the following table:

| Value | Constant Type | Meaning |
|---|---|---|
| 1 | CONSTANT_Utf8 | utf-8 format string |
| 2 | CONSTANT_Unicode | unicode format string |
| 3 | CONSTANT_Integer | integer |

-continued

| Value | Constant Type | Meaning |
|---|---|---|
| 4 | CONSTANT_Float | floating point |
| 5 | CONSTANT_Long | long integer |
| 6 | CONSTANT_Double | double floating point |
| 7 | CONSTANT_Class | class |
| 8 | CONSTANT_String | string |
| 9 | CONSTANT_Fieldref | field reference |
| 10 | CONSTANT_Methodref | method reference |
| 11 | CONSTANT_InterfaceMethodref | interface method reference |
| 12 | CONSTANT_NameAndType | name and type |

A utf-8 format string constant pool entry represents a constant character string value. Utf-8 strings are encoded so that strings containing only non-null ASCII characters, can be represented using only one byte per character, but characters of up to 16 bits can still be represented.

All characters in the range 0x0001 to 0x007F are represented by a single byte, in which bit 0 is set to binary '0' and in which bits 1–7 represent the ASCII code 0x0001 to 0x007F, respectively. The null character 0x0000 and characters in the range 0x0080 to 0x07FF are represented by a pair of two bytes, or 16 bits, denoted here as bits 0–15. Bits 0–2 are set to binary '110' and bits 8–9 are set to binary '10'. The remaining eleven bits 3–7 and 10–15 correspond respectively to the low-order eleven bits in the character to be encoded.

Characters in the range 0x0800 to 0xFFFF are represented by three bytes, or 24 bits, denoted here as bits 0–23. Bits 0–3, 8–9 and 16–17 are set to binary values '1110', '10', and '10', respectively. The remaining 16 bits 4–7, 10–15 and 18–23 correspond to the 16 bits in the character to be encoded.

The null character 0x00 is encoded in two-byte format rather than one-byte, with the result that encoded strings never have embedded nulls. Only one-byte, two-byte, and three-byte formats are used; longer utf-8 formats are unrecognized.

A utf-8 string is structured as follows:

```
CONSTANT_Utf8_info{
    u1 tag;
    u2 length;
    u1 bytes[length];
}
```

The tag field has the constant value 0x'0001' indicating a utf-8 encoded string. The length field is a two-byte field indicating the length of the string. The bytes field is the encoded string.

A UNICODE string constant pool entry represents a constant unencoded character string value. A UNICODE string is structured as follows:

```
CONSTANT_Unicode_info{
    u1 tag;
    u2 length;
    u1 bytes[length];
}
```

The tag field has the constant value 0x'0002' indicating a unicode-format string. The length field is a two-byte field indicating the length of the string. The bytes field is the string value.

An integer constant pool entry represents a four-byte integer. The constant pool entry is structured as follows:

```
CONSTANT_Integer_info {
    u1 tag;
    u4 bytes;
}
```

The tag field has the constant value 0x'0003' indicating a integer. The bytes field is the integer value.

A float constant pool entry represents a four-byte floating-point number. The constant pool entry is structured as follows:

```
CONSTANT_Float_info{
    u1 tag;
    u4 bytes;
}
```

The tag field has the constant value 0x'0004' indicating a floating-point number. The bytes field is the floating-point value.

A long integer constant pool entry represents an eight-byte integer. The constant pool entry is structured as follows:

```
CONSTANT_Long_info{
    u1 tag;
    u4 high_bytes;
    u4 low_bytes;
}
```

The tag field has the constant value 0x'0005' indicating a long integer. The high_bytes and low_bytes fields together make up the integer value. A long integer constant pool entry takes up two spots in the constant pool 565. If this is the nth entry in the constant pool 565, then the next entry will be numbered n+2.

A double float constant pool entry represents an eight-byte floating-point number. The constant pool entry is structured as follows:

```
CONSTANT_Double_info{
    u1 tag;
    u4 high_bytes;
    u4 low_bytes;
}
```

The tag field has the constant value 0x'0006' indicating a double floating-point number. The high_bytes and low_bytes fields together make up the floating-point value. A double float constant pool entry takes up two spots in the constant pool 565. If this is the nth entry in the constant pool 565, then the next entry will be numbered n+2.

A class constant pool entry represents a Java class or an interface. The constant pool entry is structured as follows:

```
CONSTANT_Class_info{
    u1 tag;
    u2 name_index;
}
```

The tag field has the constant value 0x'0007' indicating a class. The name_index field is a subscript into the constant pool 565, to a utf-8 format string constant that gives the string name of the class.

A string constant pool entry represents Java objects of the built-in Java type "String." The constant pool entry is structured as follows:

```
CONSTANT_String_info {
    u1 tag;
    u2 string_index;
}
```

The tag field has the constant value 0x'00008' indicating a string. The string_index field is a subscript into the constant pool 565, to a utf-8 format string constant that gives the value to which the String-type object is initialized.

A field constant pool entry, method reference constant pool entry, and interface method reference constant pool entry represent references to Java fields, methods, and interface methods, respectively. The constant pool entries are structured as follows:

```
CONSTANT_Fieldref_info{
    u1 tag;
    u2 class_index;
    u2 name_and_type_index;
}
```

```
CONSTANT_Methodref_info{
    u1 tag;
    u2 class_index;
    u2 name_and_type_index;
}
```

```
CONSTANT_InterfaceMethodref_info{
    u1 tag;
    u2 class_index;
    u2 name_and_type_index;
}
```

The tag field has the constant value 0x'0009', 0x'000A', or 0x'000B', indicating a field reference, method reference, or interface method reference, respectively. The class_index field is a subscript into the constant pool 565, to a class constant that is used to identify the name of the class or interface containing the field or method. The name_and_type_indexfield is a subscript into the constant pool 565, to a NameAndType constant that is used to identify the name and signature of the field or method.

A NameAndType constant pool entry represents a field or method without indicating the class to which the name or field, as the case may be, belongs. The constant pool entry is structured as follows:

```
CONSTANT_NameAndType_info{
    u1 tag;
    u2 name_index;
    u2 signature_index;
}
```

The tag field has the constant value 0x'000C' indicating a NameAndType entry. The name_index field is a subscript into the constant pool 565, to a utf-8 format string constant that gives the name of the field or method. The signature_index field is a subscript into the constant pool 565, to a utf-8 format string constant that gives a signature of the field or method. The signature, in this context, refers to a string that represents a type of a method, field or array. The field signature represents the value of an argument to a function or the value of a variable. A return-type signature represents the return value from a method. An argument signature represents an argument passed to a method. A method signature comprises one or more arguments signatures and a return signature, thereby representing the arguments expected by a method, and the value that it returns.

The structure and self-referential nature of the cell pool thereby provides great flexibility in implementation of data encoded in an applet file.

Access_Flags

The access_flags field 566 contains a mask of up to sixteen modifiers used with class, method, and field declarations. The same encoding is used on similar fields in field_info and method_info as described below. The access_flags field is encoded as follows:

| Flag Name | Value | Meaning | Used By |
|---|---|---|---|
| ACC_PUBLIC | 0x0001 | Visible to everyone | Class, Method, Variable |
| ACC_PRIVATE | 0x0002 | Visible only to the defining class | Method, Variable |
| ACC_PROTECTED | 0x0004 | Visible to subclasses | Method, Variable |
| ACC_STATIC | 0x0008 | Variable or method is static | Method, Variable |
| ACC_FINAL | 0x0010 | No further subclassing, overriding, or assignment after initialization | Class, Method, Variable |
| ACC_SYNCHRONIZED | 0x0020 | Wrap use in monitor lock | Method |
| ACC_VOLATILE | 0x0040 | Can't cache | Variable |
| ACC_TRANSIENT | 0x0080 | Not to be written or read by a persistent object manager | Variable |
| ACC_NATIVE | 0x0100 | Implemented in a language other than Java | Method |
| ACC_INTERFACE | 0x0200 | Is an interface | Class |
| ACC_ABSTRACT | 0x0400 | No body provided | Class, Method |

This_Class

The this_class field 567 is an index into the constant pool 565; constant_pool[this_class] must be of type CONSTANT_class.

Super_Class

The super_class 568 field is an index into the constant pool 565. If the value of super_class field 568 is nonzero, then constant_pool[super_class]must be a class, and gives the index of this class's superclass (that is, the class from which the present class is derived) in the constant pool 565. If the value of super class field 568 is zero, then the class being defined must be java.lang.Object, and it has no superclass.

Interfaces_Count

The interfaces_count field 569 gives the number of interfaces that this class implements.

Interfaces Table

Each value in interfaces table 570 is an index into the constant pool 565. If an table value is nonzero(interfaces[i] !=0, where 0<=i<interfaces_count), then constant_pool [interfaces[i]]must be an interface that this class implements.

Fields_Count

The fields_count field 571 gives the number of instance variables, both static and dynamic, defined by the this class field. The fields table 572 includes only those variables that are defined explicitly by this class. It does not include those instance variables that are accessible from this class but are inherited from superclasses.

Fields Table

Each value in the fields table 572 is a more complete description of a field in the class. Each field is described by a variable length field_info structure. The format of this structure is as follows:

```
field_info{
    u2 access_flags;
    u2 name_index;
    u2 signature_index;
    u2 attributes_count;
    attribute_info attributes[attribute_count];
}
```

The access_flags field is a set of sixteen flags used by classes, methods, and fields to describe various properties and how they many be accessed by methods in other classes. This field has the same names, values and meanings as the access_flags field 566 previously disclosed.

The possible flags that can be set for a field are ACC_PUBLIC, ACC_PRIVATE, ACC_PROTECTED, ACC_STATIC, ACC_FINAL, ACC_VOLATILE, and ACC_TRANSIENT. At most one of ACC_PUBLIC, ACC_PROTECTED, and ACC_PRIVATE can be set for any method.

The name_index field is a subscript used to index into the constant pool 565 indicating a CONSTANT_Utf8 string, which is the name of the field.

The signature_index field is a subscript that is used to index into the constant pool 565 to indicate a CONSTANT_Utf8 string, which is the signature of the field.

The attributes_count field indicates the number of additional attributes about this field.

The attributes field represents the attributes of a particular field represented by the field_info structure. A field can have any number of optional attributes associated with it. For example, the "ConstantValue" attribute, which indicates that this field is a static numeric constant, indicates the constant value of that field.

Methods_Count

The methods_count field 573 indicates the number of methods, both static and dynamic, defined by this class. This table only includes those methods that are explicitly defined by this class. It does not include inherited methods.

Methods Table

Each value in the methods table 574 is a more complete description of a method in the class. Each method is described by a variable length method_info structure. The format of this structure is as follows:

```
method_info{
    u2 access_flags;
    u2 name_index;
    u2 signature_index;
    u2 attributes_count;
    attribute_info attributes[attribute_count];
}
```

The access_flags field is a set of sixteen flags used by classes, methods, and fields to describe various properties and how they many be accessed by methods in other classes. This field has the same names, values and meanings as the access_flags field 566 previously disclosed. The possible fields that can be set for a method are ACC_PUBLIC, ACC_PRIVATE, ACC_PROTECTED, ACC_STATIC, ACC_FINAL, ACC_SYNCHRONIZED, ACC_NATIVE, and ACC_ABSTRACT. At most one of ACC_PUBLIC, ACC_PROTECTED, and ACC_PRIVATE can be set for any method.

The name_index field is a subscript used to index into the constant pool 565 indicating a CONSTANT_Utf8 string, which is the name of the method.

The signature_index field is a subscript that is used to index into the constant pool 565 to indicate a CONSTANT_Utf8 string, which is the signature of the method.

The attributes_count field indicates the number of additional attributes about this method.

The attributes field represents the attributes of a particular method represented by the method_info structure. A method can have any number of optional attributes associated with it. Each attribute has a name, and other additional information. For example, the "Code" attribute describes the bytecodes that are executed to perform this method, and the "Exceptions" attribute describes the Java Exceptions that are declared to result from the execution of the method.

Attributes_Count

The attributes_count field 575 indicates the number of additional attributes about this class.

Attributes

The attributes table 576 defines the attributes associated with the class. A class can have any number of optional attributes associated with it. For example, the "SourceFile" attribute indicates the name of the source file from which this class file was compiled.

Because of the highly structured nature of the Java CLASS file format, the file format is particularly well-suited for the purpose of encoding an OID into an applet file. In particular, the OID may be encoded as a attribute associated with the applet class. The structured nature of the CLASS format facilitates retrieval of the OID attribute. The OID may be most easily implemented as an attribute associated with the class and encoded into attribute table 576. It will be recalled that attribute table 576 includes all attributes associated with this class, such as the "SourceFile" attribute. An additional attribute, the OID attribute may be implemented to provide the OID for the applet.

The OID attribute has the following format:

```
OID_attribute{
    u2 attribute_name_index;
    u4 attribute_length;
    u2 oid_index;
}
```

The attribute_name_indexfield is a two-byte field that provides an index into constant pool 565. The value in the attribute_name_indexfield is used to select a constant pool entry of type CONSTANT_Utf8 string encoding the character string "OID".

The attribute_length field is a four-byte field containing the value 0x0002, indicating that the following oid_index field is two bytes in length.

The oid_index field is a two-byte field that that provides an index into constant pool 565. The value in the oid_index field is used to select a constant pool entry of type CONSTANT_Utf8 string. The string encoded in the selected CONSTANT_Utf8 string is the ASN.1 OID value associated with this applet.

Figure 5B:
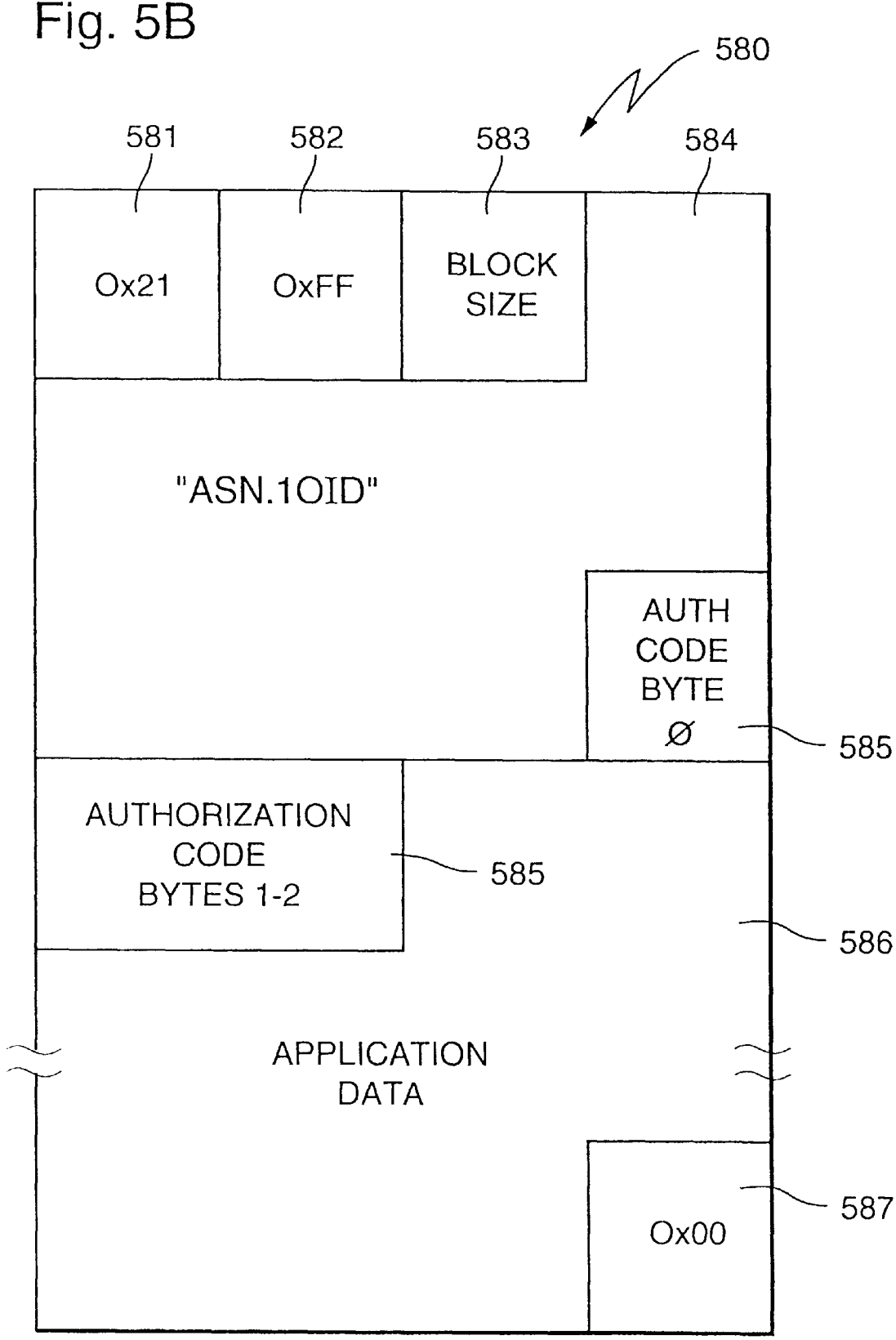
FIG. 5B depicts the format of a GIF Application Extension data area.

Another file type that lends itself to including an embedded OID is the CompuServe Information Service's Graphics Interchange Format (GIF). The GIF file format is described in CompuServe, Inc., *Graphics Interchange Format Version 89a (modified)* (Jan. 9, 1995), the disclosure of which is hereby incorporated by reference. The GIF specification is primarily geared to the encoding of compressed data that may be used to represent a graphic image. The GIF format specifies the optional inclusion of an Application Extension, a data area that may include application-specific data. FIG. 5B depicts the format of an Application Extension data area 580.

One-byte Extension Introducer 581 has a value 0x21, which defines the data area as an extension. One-byte Application Extension Label 582 has a value 0xFF, which identifies the extension as an Application Extension. Blocksize 583 is a one-byte field that defines the size of the block, up to but not including Application Data 586, and has the value 0x0B (decimal 11). Application Identifier 584 is an eight-byte printable ASCII sequence used to identify the application associated with the Application Extension. A value of 'ASN.1OID' indicates that the Application Extension 580 is used to encode an ASN.1OID. Application Authorization Code 585 is three bytes in length, and is optionally used by an application to validate the Application Identifier 585. It need not be employed in the present invention. Application data 586 is application-dependent data, and may be used to encode an OID. Block Terminator 587 is a one-byte field containing a value 0x00, and is used to indicate the end of the Application Extension 580.

Application data 586 may be used to encode an OID in the following form:

```
ASN.1_OID{
    int length;
    string oid;
}
```

Where the length field is an integer that indicates the length of the OID, and the oid field is a character value of the OID associated with the GIF file.

In the preferred embodiment, following the extraction of the OID from the received file, client computer 210 must perform some verification of received object 510, to validate that the received object 510 does, in fact, correspond to the OID specified and allocated by the software distributor that has responsibility for the OID. Typically, this may be performed by transmitting with the object 510 a digital signature associated with the file. Numerous methods of calculating digital signatures are known. According to one such methodology, a "message digest" is first calculated based upon the contents of the file to be digitally signed, in this case file 510. A message digest is the fixed-length result when a variable length message or file is provided to a one-way hashing function. A message digest helps verify that a message has not been altered, because a message digest calculated on an altered message would not equal the message digest on the unaltered message. After the message digest is calculated, the digest is encrypted using a private key associated with the software distributor. A recipient of the message (e.g., file 510) and the encrypted message digest for that message may validate the content of the message by first calculating its own version of the message digest, and then decrypting the received message digest using a public key maintained and widely distributed by the software distributor, and known to be valid and associated with that software distributor because it can be validated with a known registration authority. If the calculated message digest is equal to the decrypted received message digest, the message is known to be unaltered.

Message validation may be performed using any of a number of widely available public key cryptography methods. Examples of such methods include Private Communications Technology ("PCT") from Microsoft, Inc., Secure Hyper-Text Transport Protocol ("SHTTP") from Theresa Systems, Shen, Kerberos, Photuris, Pretty Good Privacy ("PGP") and Ipv6.

It should be noted that validation is a required step only in an untrusted environment, where the status of received objects is not known or is not trusted. In a trusted environment, in which the integrity of the object IDs and their associated resources are known to be valid, or where there is a high degree of confidence in the OID-resource coherency and the consequences of incoherence are minimal, the validation step may be ignored. For example, in a non-mission- critical environment in which all clients and all servers are under the control of the authority responsible for all of the OIDs, the validation of received objects might be ignored.

Figure 6:
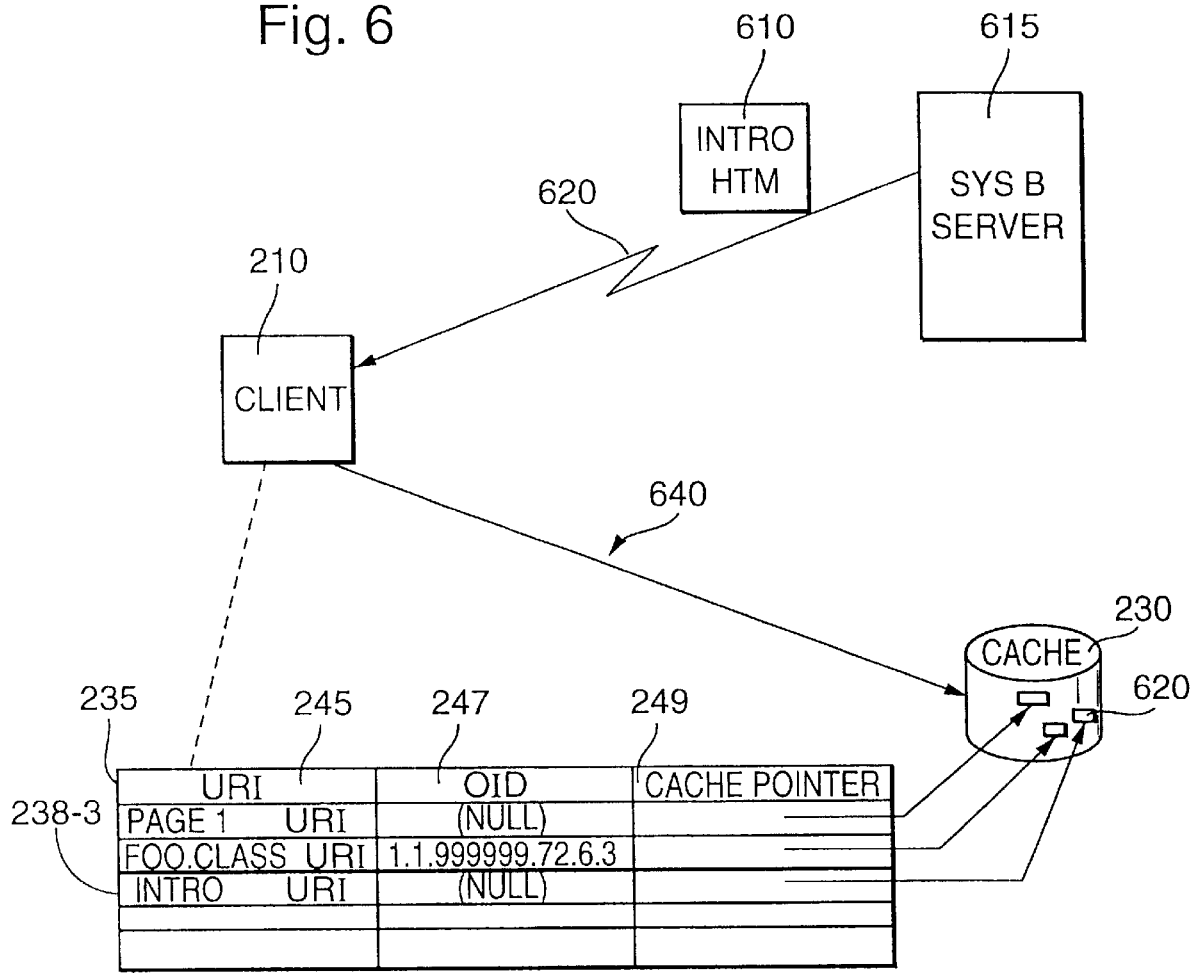
FIG. 6 depicts transmission of a second HTML document from a second HTTP server to the client computer over a communications link.

FIG. 6 depicts transmission of a second HTML document 610 from a second HTTP server 615, named SYSB, to client 210 over communications link 620. Upon receipt of document 610, client 210 updates cache 230 as previously described. That is, client 210 adds a new row 238-3 in which URI column 245 is set to the URI for file 610, OID column 247 is set to null, and cache pointer column 249 is set to point to cache element 620.

FIG. 7 depicts an example of HTML document 610 illustrative of the present invention. As with previous document 225, HTML document 610 comprises a number of HTML tags 710, including applet tag 730. Applet tag 730 comprises a CODE parameter 740, a WIDTH parameter 742, and a HEIGHT parameter 744, and OID parameter 750. It will be noted that the values for the CODE, WIDTH, and HEIGHT parameters in applet tag 730 are arbitrary and are not the same as those previously shown for Applet tag 330 in FIG. 3. However, it will be noted that the OID parameter 750 has a value of 1.1.999999.72.6.3, which is identical to the previously obtained object, as can be seen by reference to cache table row 238-2 in FIG. 5. Therefore, it will be seen that there are two different methods by which client 210 may obtain a copy of the desired object. It may issue a second HTTP request to server SYSB 615 using the URI, or it may retrieve the corresponding cache element 520 from the cache.

Figure 8:
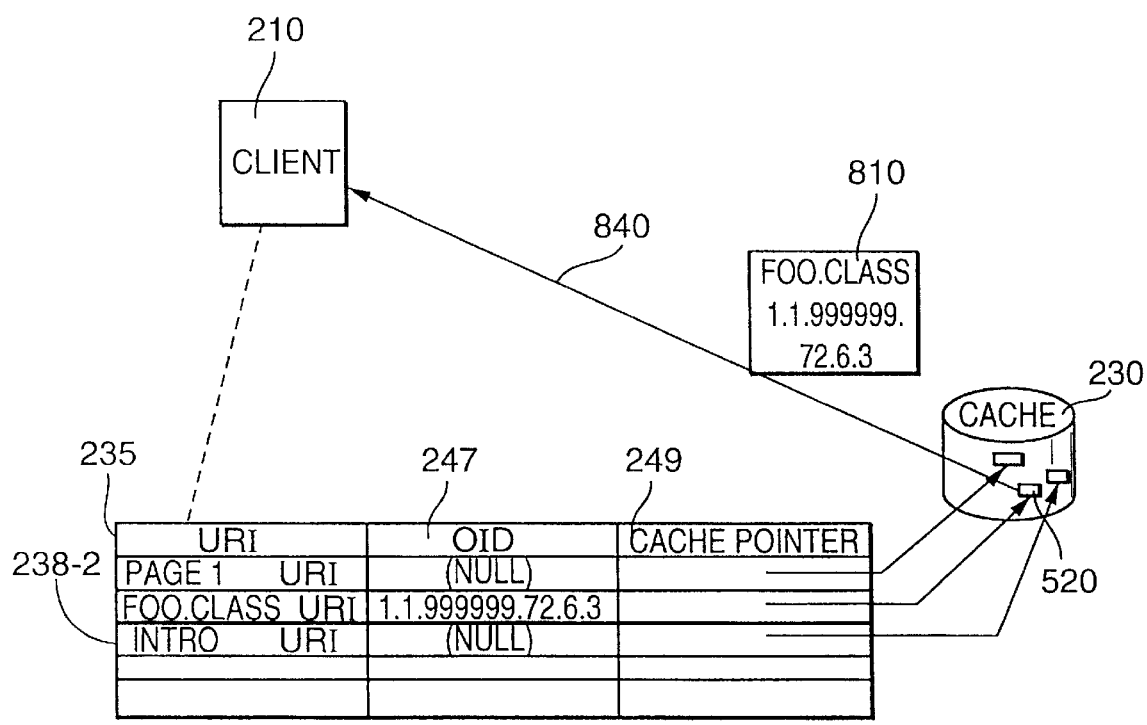
FIG. 8 depicts the process by which the client computer obtains a copy of the desired object from a cache.

FIG. 8 depicts the process by which client computer 210 obtains a copy of the desired object. Using the OID as specified in document 610, client computer 210 traverses cache table 235, searching for a matching OID value in column 247. As can be seen from FIG. 8, a match is found in row 238-2. Client computer 210 then references the corresponding cache pointer column 249 for row 238-2, which points to cache element 520 within cache 230. Client computer 210 then copies cache element 520 from cache 230 to its own memory as shown by arrow 840. It will be noted that the copy loaded, as shown by object 810, is equal to the contents previously downloaded as shown in FIG. 5 from server SYSA, and is not freshly loaded from server SYSB 615. That is, the cache copy was obtained without regard for the location from which it was originally obtained, or from the location specified in HTML document 610.

Thus, FIGS. 2 through 8 depict a location-independent means of obtaining copies of resources, which would otherwise require redundant transmission of copies of resources identical to copies that had already been previously obtained. Although the examples shown depict retrieval of a data object in the form of a Java applet or a GIF file, the invention may also be applied to retrieval of any machine-readable resource, for example, a portion of a computer program such as a subroutine or other program segment, a text file, a sound file, or a data object that comprises a collection of multiple data objects.

Figure 9:
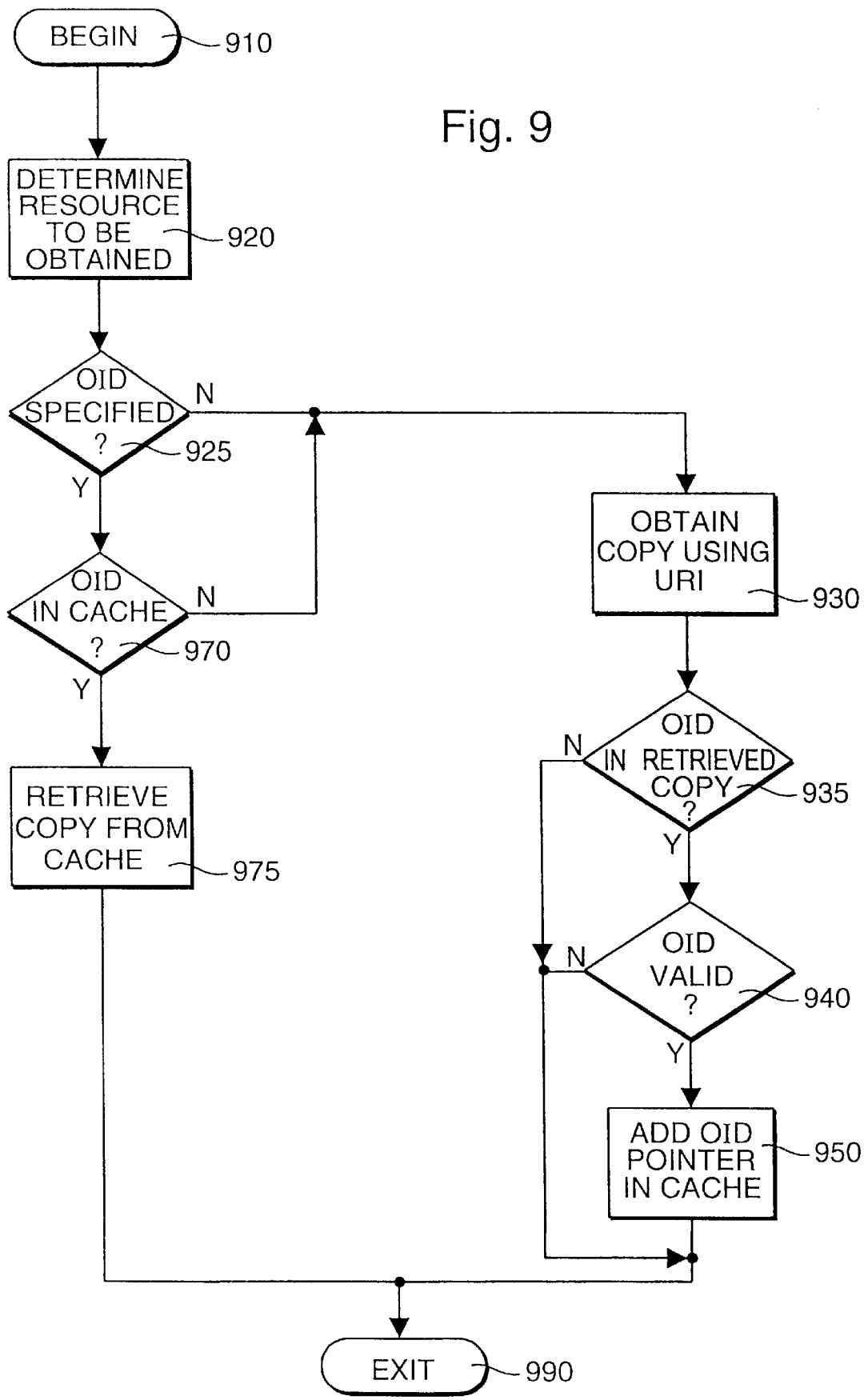
FIG. 9 is a flow chart depicting the overall operation of the invention.

FIG. 9 is a flow chart depicting the overall operation of the invention. Execution begins in step 910. In step 920, the client computer determines what resource is desired to be obtained, e.g., by examining an applet tag in a previously downloaded HTML file. In step 925, the client computer checks to see whether an OID was specified for the desired resource. If no OID was specified, execution proceeds with step 930. In step 930, the client computer obtains a copy using the URI, for example by issuing an HTTP GET request to the server corresponding to the URI.

In step 935, the client verifies that an OID was encoded into the retrieved copy. If so, control proceeds to step 940. In step 940, the client checks to see whether the OID is valid, for example, by verifying a digital signature. If so, control proceeds to step 950. In step 950, client computer 210 updates the OID status in the cache for the file obtained. If either no OID is specified in the retrieved copy, or an OID is specified but is not valid, step 950 is skipped, and control proceeds to step 990 where processing of the retrieved object is complete. As noted previously, the steps of verifying the OID from the copy of the retrieved object, and validating the OID against the received object, are optional and may be omitted in certain environments.

Referring again to step 925, if an OID was specified, control proceeds to step 970. In step 970, the client computer inspects the cache table to determine whether an object with the desired object identifier has previously been downloaded and is available in the cache. If no such object is found in the cache, control proceeds to step 930, as if no OID had been specified. If the desired OID entry is found in the cache table, however, control proceeds to step 975, in which the client computer retrieves the cache copy, loads it into memory and proceeds to execute using the copy retrieved from the cache. In any event, after step 975, processing for the object exits at step 990.

Figure 10:
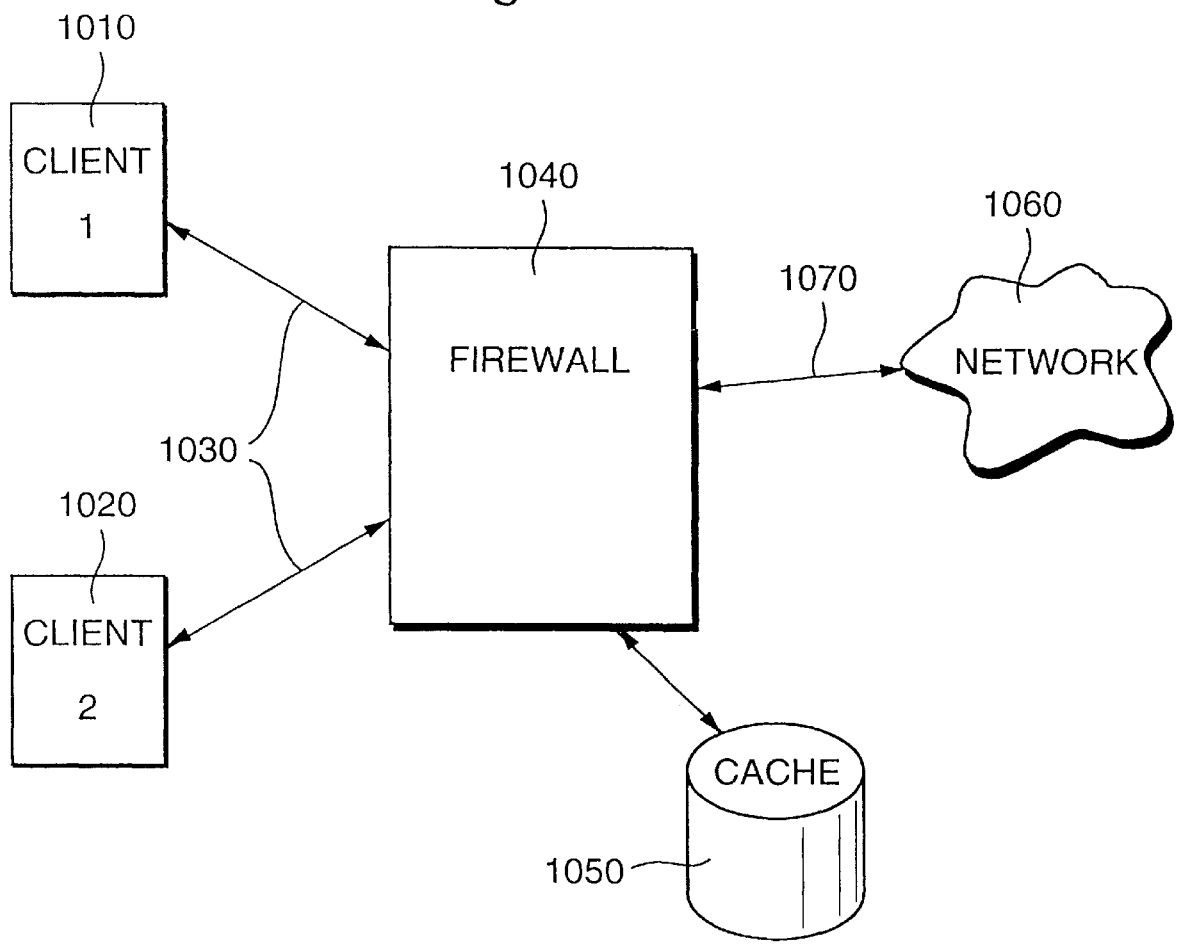
FIG. 10 depicts an embodiment of the present invention in which a single cache is shared by a plurality of clients.

FIG. 10 depicts an alternate embodiment of the present invention. As shown in FIG. 10, a plurality of clients 1010 and 1020 are in communication with a firewall server 1040 using communication links 1030. Firewall server 1040 may be, for example, a proxy server, a firewall or a gateway. Cache 1050 is operated under the control of firewall server 1040. In response to request from clients 1010 and 1020, firewall server 1040 makes requests to various servers in network 1060 over communication link 1070.

In the embodiment depicted it is not necessary for clients 1010 and 1020 to maintain their own caches. Instead, requests for resources are provided to the firewall server 1040 and include both the location-dependent URI associated with the specific copy of the resource, as well as the location independent OID (if any) associated with the resource. Firewall server 1040 maintains cache 1050 as previously described. When an object with an OID corresponding to an OID requested by one of clients 1010 or 1020 is found in cache 1050, firewall server 1040 responds to the respective client with a copy of the object as obtained from the cache. If no such object is found in the cache, firewall server 1040 uses the supplied URI to obtain a new copy from network 1060.

While the invention is described in terms of preferred embodiments in a specific system environment, those skilled in the art will recognize that the invention can be practiced, with modification, in other and different hardware and software environments within the spirit and scope of the appended claims.

What is claimed is:

1. A method for obtaining a copy of a data object, comprising the steps of:

receiving from at least one client computer a request for a second object, the second object making reference to the data object by use of a location-dependent identifier and a globally-unique location-independent identifier that identities the data object wherein the data object has an internal storage format capable of storing the globally-unique location-independent identifier;

interrogating a cache table using the globally-unique location-independent identifier to determine whether a copy of the data object is cached, the cache table including a data column containing a location-dependent identifier, a second column containing the globally-unique location-independent identifier, and a third column containing a cache location pointer; and if the data object is cached, providing a cached copy of the data object to the client computer.

2. The method as recited in claim 1, in which the cached data object was retrieved in response to a request from a second client computer.

3. The method as recited in claim 1, further comprising the step of:
(d) if the data object is not cached, performing a network call to obtain a copy of the data object.

4. The method as recited in claim 1, in which the globally-unique location-independent identifier is an ASN.1 object identifier.

5. The method as recited in claim 1, in which the data object comprises an executable program segment.

6. The method as recited in claim 1, in which the data object is a computer program.

7. The method as recited in claim 1, in which the data object is a class object.

8. The method as recited in claim 1, in which the data object is a program subroutine.

9. The method as recited in claim 1, in which the executable program segment is in a platform-independent object code form.

10. The method as recited in claim 1, in which the data object is an image file.

11. The method as recited in claim 1, in which the data object is a text file.

12. The method as recited in claim 1, in which the data object is a sound file.

13. A method as recited in claim 1 wherein the globally-unique location-independent identifier is stored as a parameter in an applet tag in the second object.

14. A method as recited in claim 1 wherein the data object having a Java class format stores the globally-unique location-independent identifier in an attributes field.

15. An apparatus for obtaining a copy of a data object, the apparatus comprising:
a server computer and a cache;
the cache being indexed by a cache table, the cache table including a data column containing a location-dependent identifier, a second column containing a globally-unique location-independent identifier, and a third column containing a cache location pointer; and
the computer being responsive to requests for a second object, the second object making reference to the data object by use of a location-dependent identifier and a globally-unique location-independent identifier that identifies the data object, wherein the data object has an internal storage format capable of storing the globally-unique location-independent identifier, and whereby the computer interrogates the cache table using the globally-unique location-independent identifier to determine whether the data object is cached, and if the data object is cached, obtains a copy of the data object from the cache.

16. The apparatus as recited in claim 15, in which the data object comprises an executable program segment.

17. The apparatus as recited in claim 15, in which the data object is a computer program.

18. The apparatus as recited in claim 15, in which the data object is a class object.

19. The apparatus as recited in claim 15, in which the data object is a program subroutine.

20. The apparatus as recited in claim 15, in which the executable program segment is in a platform-independent object code form.

21. The apparatus as recited in claim 15, in which the data object is an image file.

22. The apparatus as recited in claim 15, in which the data object is a text file.

23. The apparatus as recited in claim 15, in which the data object is a sound file.

24. The apparatus as recited in claim 15, whereby if the data object is not cached, the server computer performs a network call to obtain a copy of the data object.

25. The apparatus as recited in claim 24, in which the globally-unique location-independent identifier is an ASN.1 object identifier.

26. A system for the transmission of a data object, the system comprising:
a server computer having a cache, the cache being indexed by a cache table, the cache table including a data column containing a location-dependent identifier, a second column containing a globally-unique location-independent identifier, and a third column containing a cache location pointer;
at least one client computer;
the client computer and the server computer coupled by a communication link; and
the server computer being responsive to requests from the client for a second object, the second object making reference to the data object by use of a location-dependent identifier and a globally-unique location-independent identifier that identifies the data object, wherein the data object has an internal storage format capable of storing the globally-unique location-independent identifier and whereby the server computer interrogates the cache table using the globally-unique location-independent identifier to determine whether the data object is cached, and if the data object is cached, obtains a copy of the data object from the cache, and otherwise performs a network call using the location-dependent identifier to obtain a copy of the data object.

27. The system as recited in claim 26, in which the data object is a computer program.

28. The system as recited in claim 26, in which the data object is a class object.

29. The system as recited in claim 26, in which the data object is a program subroutine.

30. The system as recited in claim 26, in which the executable program segment is in a platform-independent object code form.

31. The system as recited in claim 26, in which the data object is an image file.

32. The system as recited in claim 26, in which the data object is a text file.

33. The system as recited in claim 26, in which the data object is a sound file.

34. The system as recited in claim 26, in which the globally-unique location-independent identifier is an ASN.1 object identifier.

35. The system as recited in claim 26, in which the data object comprises an executable program segment.

36. A computer program embodied on a computer-readable medium for obtaining a copy of a data object, comprising:
a code segment receiving from at least one client computer a request for a second object, the second object making reference to the data object by use of a location-dependent identifier and a globally-unique location-independent identifier that identifies the data object, wherein the data object has an internal storage format capable of storing the globally-unique location-independent identifier;
a code segment interrogating a cache table using the globally-unique location-independent identifier to determine whether a copy of the data object is cached, the cache table including a data column containing a location-dependent identifier, a second column containing a globally-unique location-independent identifier, and a third column containing a cache location pointer; and a code segment for, if the data object is cached, providing a cached copy of the data object to the client computer.

37. The computer program as recited in claim 36, in which the data object comprises an executable program segment.

38. The computer program as recited in claim 36, in which the data object is a computer program.

39. The computer program as recited in claim 36, in which the data object is a class object.

40. The computer program as recited in claim 36, in which the data object is a program subroutine.

41. The computer program as recited in claim 36, in which the executable program segment is in a platform-independent object code form.

42. The computer program as recited in claim 36, in which the data object is an image file.

43. The computer program as recited in claim 36, in which the data object is a text file.

44. The computer program as recited in claim 36, in which the data object is a sound file.

45. The computer program as recited in claim 36, further comprising:

(d) a code segment for, if the data object is not cached, performing a network call to obtain a copy of the data object.

46. The computer program as recited in claim 36, in which the globally-unique location-independent identifier is an ASN.1 object identifier.

* * * * *